July 21, 1964 L. PODOLSKY 3,141,791

ELEMENTS AND METHOD OF MAKING

Filed April 21, 1961

INVENTOR
Leon Podolsky

BY Connolly and Hutz
ATTORNEYS

United States Patent Office 3,141,791

Patented July 21, 1964

3,141,791
ELEMENTS AND METHOD OF MAKING

Leon Podolsky, Pittsfield, Mass., assignor to Sprague Electric Company, North Adams, Mass., a corporation of Massachusetts Filed Apr. 21, 1961, Ser. No. 104,667
4 Claims. (Cl. 117—212)

This invention relates generally to data storage devices and in particular to a new and improved magnetic storage device for an information handling system.

Magnetic data storage devices involve a device which has a relatively high magnetic remanence and a substantially rectangular hysteresis characteristic. However, such devices even though they have admirable characteristics, and are well suited to act as storage devices, have certain drawbacks, such as extreme fragility, difficult fabrication, and requiring a large expenditure of preparation in adaptation into a circuit.

Some of these problems have been met by the development of a magnetic data storage device which is comprised by a length of non-magnetic electrically conducting wire which constitutes a common core and a coaxial layer of saturable ferromagnetic material extruded on the outermost surface of the core. The core and the ferromagnetic coating are then simultaneously stretched and twisted and the ends thereof maintained in a fixed position during operation of the device. Also, a copper wire central core and current-carrying member, wrapped around it a flat ribbon of magnetic material, which is generally nickel and iron, is useful as a magnetic storage device or memory element in an information handling system.

The memory elements formed of these materials provide the information handling systems with element that have so-called "square-loop" characteristics. This permits rapid and abrupt change of magnetization from one direction to another in the magnetic material. As a result of the magnetization of the magnetic material, it is possible to read-in, store and read-out information in these elements. Closely spaced parallel wires carrying the magnetic material or adjacent to it act to handle the information by the reading in, storage, and reading out of the information by coincidence currents in the parallel wires, or by other methods. The non-magnetic electrically conductive common core for a coaxial layer of saturable ferromagnetic material on the outer surface of the core has some advantages over the magnetic data storage devices made up of magnetic cores of torroidal configuration. One of these advantages is that the copper wire core can be the current conductor for switching and sensing currents and at the same time be in close coupling and proximity with the magnetic storage material. Also, the wire can be made in long continuous lengths and be assembled in multiple layers embedded in plastic tapes with great uniformity. As a result, these devices are highly acceptable for memory elements in memory handling systems.

It would be advantageous, however, to provide the saturable ferromagnetic material on the outer surface of the core in a very thin film because less magnetic material is contained in the circuit allowing higher speed in switching from one state to another and requiring less energy to effectuate the switching. Up to now, however, there has been no method for applying a thin layer of saturable ferromagnetic material on the outermost surface of the core in a spiral winding around the core. The method of applying the saturable ferromagnetic material has been to form a flat ribbon, of for example a composition of 83% nickel and 17% iron, to a thickness of ⅓ of a mil, and a width of approximately 3 mils. This is wrapped around the core, or extruded on the outermost surface of the core in a spirally wound condition which is produced by twisting the core and the ferromagnetic coating simultaneously after the magnetic material has been applied to the common core.

It is an object of this invention to provide a core of non-magnetic electrically conducting material having spirally applied on its outer surface the coaxial layer of saturable ferromagnetic material in a very thin film.

It is another object of this invention to provide a copper core wire or other non-magnetic conductive common core with a coating of magnetic material of nickel-iron composition in a very thin film on the copper core wire.

It is still another object of this invention to provide a method and means for continuously applying a thin film spirally around a copper core wire.

A still further object of this invention is to provide a magnetic storage device which is capable of being produced on a mass production basis and is readily adaptable into the various needs of information handling systems.

These and other objects of this invention will become more appjarent upon consideration of the following description taken together with the figures which show a means for applying a thin film of magnetic material to an electrically conductive non-magnetic core wire, as follows.

In general, this invention provides the continuous, controllable application of a very thin film of magnetic material in a spiral path around an electrically conductive non-magnetic core wire. The application is achieved by a rotation of the core material on its axis while in motion and may include giving the applied magnetic film desired magnetic properties.

The core wire for the memory element of this invention is reeled off one spool and onto another, the spools being mounted on means which cause the spools to revolve together in a synchronism. The spools revolve around the center line of the wire as it passes from one spool to the other, thus, the wire is rotated on its axis. The thin film forming magnetic material is applied to the rotating wire as it passes from the supply spool to the take-up spool in a thin or narrow strip which draws on the surface of the rotating wire a path of film forming material. This film forming material may either be a magnetic composition and magnetized as it is laid down or a composition which can be converted to a magnetic composition in subsequent steps. The film of material is applied to the non-magnetic wire, in a spiral band and is the magnetic material of the memory element which is eventually produced from this material. The film of material may be applied from a molten condition in a vacuum by vaporization or it also may be formed into wire filaments. The vaporized material is positioned so that the material is applied in a controllable, narrow and thin spiral strip to the wire. According to this invention, the strip may be subjected to a controllable magnetization during the vapor deposition. Also, the magnetic material may be coated on the wire in the form of a composition which is then heated or otherwise reduced or decomposed to the desired magnetic film.

Figures 1, 2, 3:
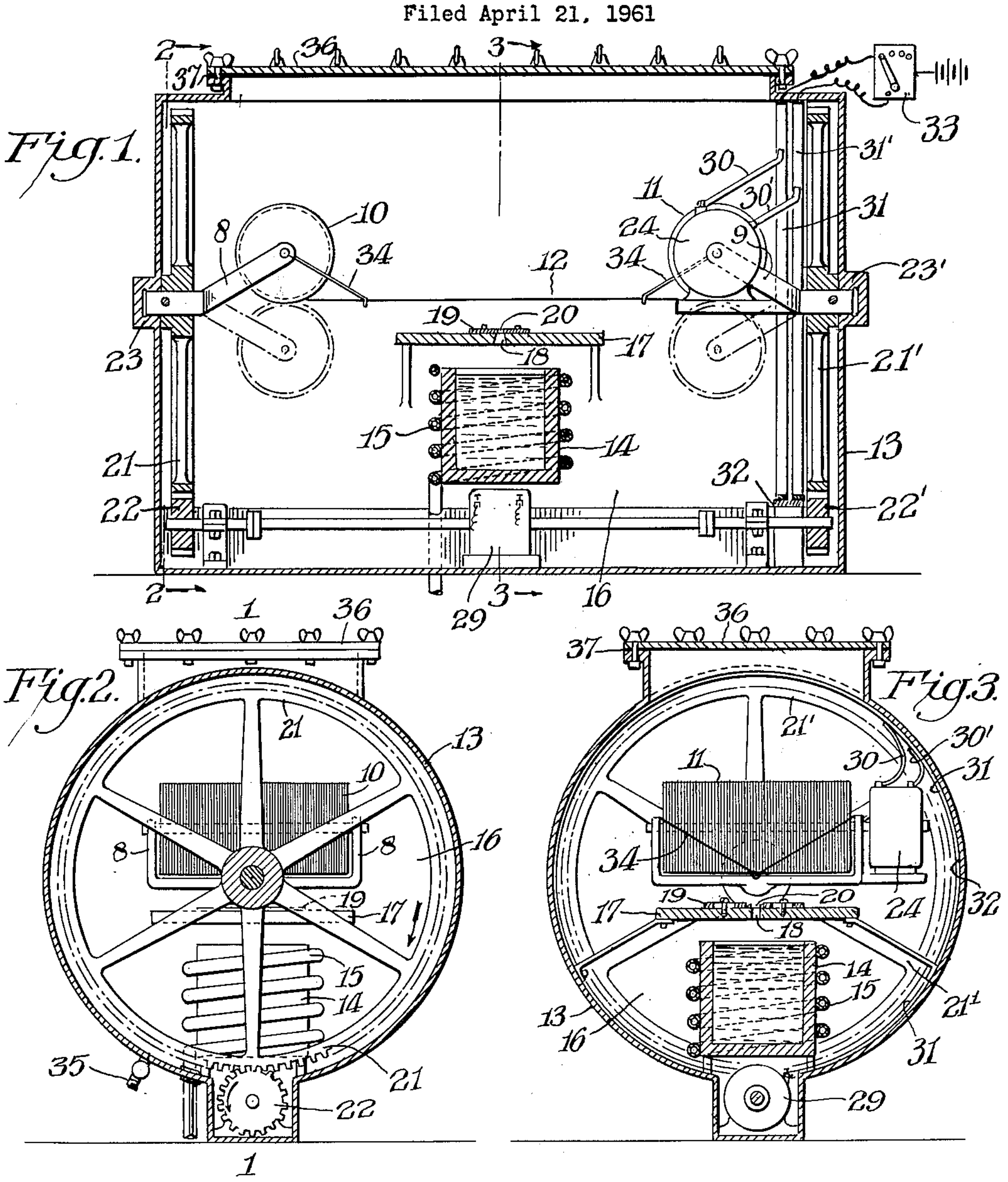
FIGURE 1 is a longitudinal vertical section of apparatus of this invention partially in elevation showing means for applying a thin film to a wire.
FIGURE 2 is a transverse section of the apparatus of FIGURE 1 taken through one end in the direction of the arrows.
FIGURE 3 is another transverse section of the apparatus of FIGURE 1 taken in the center in the direction of the arrows.

Referring to the FIGURE 1, a supply spool 10 and a take-up spool 11 is shown for transporting a small-diameter copper wire 12 from the spool 10 to the spool 11 along a centrally disposed path. Each of the spools 10 and 11 are pivotally mounted on arms 8 and 9 respectively. These arms are in turn mounted on a circular rack structure which is devised so that the spools 10 and 11 can rotate around the center line of the copper wire 12. The spools 10 and 11 are contained in a sealed casing 13 which forms an airtight chamber 16 sealed so as to contain a vacuum. Also contained within the casing 13 is a crucible 14 which in turn is enveloped by heating coils 15. The heating coils 15 are any suitable means for raising the temperature of the contents of the crucible 14 to a molten condition. For example, the heating coils 15 may be induction coils. A mask 17 is interposed between crucible 14 and the wire 12. The mask 17 is provided with an aperture 18 and so arranged that the aperture 18 is positioned directly over the open top of the crucible 14. As illustrated in the figures, the mask 17 is provided with an auxiliary removable plate 19 in which is formed a slit 20. The removable plate 19 is attachable to the upper surface of the mask 17 to align the slit 20 with the larger aperture 18. It will thus be seen that it is possible for the slit 20 to adapt the opening formed by the combined aperture 18 and slit 20. This combination provides flexibility in the control of the spiral strip.

As shown in FIGURE 2, the spool 10 is mounted on a spur gear 21 which is part of the circular rack structure. The gear 21 in turn is driven by a pinion gear 22. The gear 21 turning on the central axis serves to cause the spool 10 to revolve around this axis because the arm 8 on which the spool 10 is mounted attaches to a hub 23 at a 30° angle. The hub 23 of the gear 21 swings the arm 8 in a circular path at the end of which the spool 10 describes a circular orbit around the central turning axis. As seen in FIGURE 1, the take-up spool is mounted on a correlative spur gear 21′ driven by a correlative gear 22′. The arm 9 is mounted on hub 23′. The respective gears 22 and 22′ are driven by motor 29.

As shown in FIGURE 3, the take-up spool 11 at the other end of the casing 13 is provided with a motor 24. The motor 24 is powered thru wiping contacts 30 and 30′ which engage energizing contacts 31 and 31′ circularly arranged on a circular face 32 on the inside of the casing 13. A rheostat 33 is shown providing power. The motor 24 turns the take-up spool 11 to draw the wire 21 onto the take-up spool 11 from the supply spool 10. The rheostat 33 provides regulation of the motor which provides control of the speed of the wire traversing the chamber 13. Similarly, the motor 29 can be controlled to vary the revolving of the spools 10 and 11. The wire 12 is aligned within the chamber 16 by guide wires 34 so as to pass directly over the aperture 18 and the slit 20 in moving from the supply spool 10 to the take-up spool 11. In so passing across the opening provided by the aperture 18 and the slit 20, the wire 12 passes through the vapor from open top of the crucible 14. According to this invention the molten condition of the material provides for evaporation from the crucible. The vaporization from the molten contents of the crucible 14 are of such a nature as to become deposited upon the wire 12 when it comes in contact therewith. This deposition of the material from the crucible 14 on the moving wire 12 lays a spiral film of material on the moving wire. The film is controllable as for example the pitch by the motor speed. Magnetization of the film is also controllable.

Figure 4:
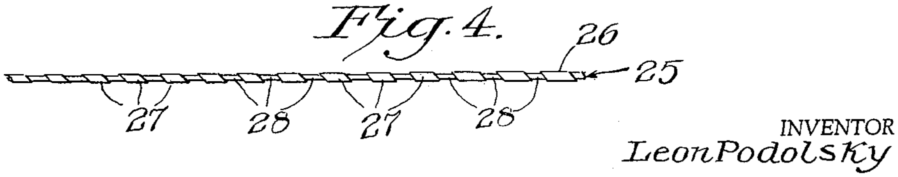
FIGURE 4 is an elevational view of an information handling device of this invention.

In FIGURE 4 a memory element 25 is shown having a surface film 26 according to this invention of deposited material. As seen in the elevation view of FIGURE 4, the turns 27 of the helical surface film 26 are spaced apart by areas 28 of the bare wire.

The casing 13 is provided with suitable hose couplings 35 (FIGURE 2) for evacuation means and a removable access plate 36 and sealing gasket 37 (FIGURE 1).

In a specific embodiment of this invention a copper wire 12 of the convenient diameter, as for example 3 mils, is wound on the supply spool 10. A nickel-iron alloy of 83% nickel and 17% iron is melted in the crucible 14 by heating through the coils 15.

The chamber 13 is evacuated to a vacuum of the order of $5\times10^{-6}$ millimeters pressure of mercury. The wire 12 is drawn from the supply spool 10 to the take-up spool 11 extending across the mask 17 a short distance above the slit 20. The slit 20 has a width of .01 inch. The mechanism is put into operation and the take-up spool rotates to draw the copper wire 12 into the spool 11. At the same time the drive of the two spur gears 21 simultaneously rotates both spools 10 and 11 around the path of the wire as an axis. Thus, the wire is drawn across the chamber 16 and rotated about its longitudinal center line at the same time. Beneath the mask 17 and the slit 20 in the crucible 14 the molten alloy evaporates by vaporization from its surface. The resultant nickel-iron vapor travels forward to the region of the mask and penetrates through the aperture 18 and the slit 20. The wire 12 passes the removable plate 19 at a spacing which causes the vapor issuing from the slit 20 to project onto the moving wire 12 in a pattern. The vaporized metal is present in the area above the mask 17 only in the section where it penetrates through the slit 20. The metal vapor going through the slit 20 comes in contact with the copper wire above the slit and condenses on the wire 12 because the wire is relatively cold. In condensing on the wire the copper deposits in the pattern formed by the slit 20. The copper wire traverses and is rotated above the slit so that it has deposited on it a film of nickel-iron magnetic material by condensation. This deposit forms the spiral surface layer 26 as shown in FIGURE 4 and defined by the path of the beam of vaporization issuing from the slit 20.

The dimension and disposition of the surface layer 26 is determined by the width of the slit 20, the speed of transporting the wire 12 across the chamber 13 and the rate of rotation of the wire 12. The transporting speed is determined by the motor 24 and the rate of rotation and revolution is determined by the rotation of spur gears 21, which in turn is determined by the rotation of speed of a motor 29 which drives the respective drive gears 22.

During the vapor deposition a magnetic field may be used to give magnetic properties and orientation of the final film.

The composition of the deposited magnetic film is controlled by the make-up of the ingredients in the melting crucible 14. The vacuum pressure and the metal temperature also are factors in determining the make up of the magnetic film on the non-magnetic electrically conductive central core. The rate of evolution of the ingredients from the surface of the molten material depends upon the respective melting points of the ingredients and the vapor pressure in the chamber 16.

The above-described embodiment may be modified by the use of other sources of the vaporized magnetic materials. For example, nickel-iron wire filament can be formed and disposed in the chamber 16 beneath the mask 17. The filaments may then be heated electrically to incandescence and to a temperature which causes the materials to vaporize. If the filaments are made up in the proper proportions the resultant vapor when deposited on the non-magnetic, but electrically conductive wire, will provide a magnetic film having the desired ratio of ingredients. There are still other means for heating the magnetic materials to the vapor point, such as providing strips of materials of the desired characteristics and in the desired ratio over some heating means, such as a filament of a higher melting point metal, for example, tungsten. The filament is then heated to cause vaporization of the strips. This assembly is positioned in the chamber 16 below the mask 17 and the resultant vapor deposition through the slit 20 provides a beam of vaporization for deposition on the wire which is comparable to that described above in connection with vaporization by evaporation from a molten bath.

In the above description and the embodiments mentioned, the material has been deposited in a spiral film on the non-magnetic carrier from a vapor in an evacuated chamber. This is a preferred technique but there are other methods of forming a spiral film of magnetic material on a carrier electrically conductive wire. One such method is to coat the wire while it is being transported from a supply spool to a take-up spool and rotating the wire at the same time as described above in connection with the figures. This coat can be a film of metal salts or metal organic compositions. This film can be applied by spraying through a slit mask or by roller application. After application of this coat the non-magnetic electrically conductive wire carrying the spiral band coat may be heated to reduce and decompose the metal salts making up the coated composition. By this transformation the metal salts or metal organic compounds are transformed to a desired magnetic film. For example, there may be reduction in a hydrogen gas atmosphere to bring about a satisfactory transfer of the metal compound to a magnetic material.

The various advantages of this invention include the provision of the magnetic layer film in close and intimate contact with the non-magnetic electrically conductive carrier wire. This close and intimate contact makes for greater magnetic efficiency. Further, this technique avoids a separate wrapping operation and thus leads to simplicity and speed in manufacture. It is notable that the memory element can be produced in a continuous length with a precise uniformity of dimension and equality of properties. The product has a low unit cost and at the same time the method of this invention permits a great flexibility in design and characteristics of the product memory element. This flexibility is provided by the ease of adjustment of the dimensions and properties of the magnetic film making up the saturable ferromagnetic surface layer on the non-magnetic electrically conductive central core.

An additional advantage is found in the ability to produce desired magnetic properties or orientation in the deposited film by applying a magnetic field during the vapor deposition.

It will be understood that the formation of the memory element by the production of a magnetic spiral band from a vaporized magnetic material has several critically distinctive features as indicated above.

As the above described embodiments are set forth for the purpose of illustration and as further modifications will be readily apparent to those skilled in the art, it is intended that this invention be limited only by the scope of the appended claims.

What is claimed is:

1. A method of forming a spiral magnetic thin film on the surface of a non-magnetic electrically conductive central core which comprises vaporizing a magnetic material in a vacuum, passing a portion of the vaporized material through a defining aperture adjacent the source of vaporization, forming a beam of vaporized material with said aperture, continuously transporting a non-magnetic electrically conductive wire in a given direction through said beam of the vaporized material depositing a pattern of the vaporized material on the wire, rotating said continuously transported wire on its axis during said movement, and controllably forming a spiral band of said magnetic material on said central core with said deposited pattern from said beam.

2. A method of forming a spiral magnetic thin film on the surface of a non-magnetic electrically conductive central core which comprises vaporizing a magnetic material in a vacuum, passing a portion of the vaporized material through a defining aperture adjacent the source of vaporization, forming a beam of vaporized material with said aperture, moving a non-magnetic electrically conductive wire through said beam of the vaporized material depositing a pattern of the vaporized material on the wire, by variable speed means, rotating said wire and the variable speed means on the wire axis during said movement, and controllably forming a spiral band of said magnetic material on said central core with said deposited pattern from said beam.

3. A method of forming a spiral magnetic thin film on the surface of a non-magnetic electrically conductive central core which comprises vaporizing a material in a vacuum, passing a portion of the vaporized material through a defining aperture adjacent the source of vaporization, forming a beam of vaporized material with said aperture, moving a non-magnetic electrically conductive wire through said beam of the vaporized material by variable speed means, depositing a pattern of the vaporized material on the wire, rotating said wire and the variable speed means on the wire axis during said movement, and subjecting the deposition of said vaporized material on said wire to magnetization so as to form a spiral band of magnetic material on said central core with said deposited pattern from said beam.

4. A method of forming a spiral magnetic thin film on the surface of a non-magnetic electrically conductive central core which comprises moving a non-magnetic electrically conductive wire in contact with a beam of vaporized material, rotating said wire on its axis as it passes through said beam, projecting a pattern of said vaporized material on said wire and forming a spiral band of thin material on said wire and subsequently converting said material of said spiral band to a magnetic material.

References Cited in the file of this patent

UNITED STATES PATENTS

| | | |
|---|---|---|
| 2,418,804 | Hood | Apr. 8, 1947 |
| 2,792,563 | Rajchman | May 14, 1957 |
| 2,853,402 | Blois | Sept. 23, 1958 |

FOREIGN PATENTS

| | | |
|---|---|---|
| 229,409 | Australia | July 18, 1960 |
| 573,380 | Canada | Mar. 31, 1959 |